United States Patent
Shectman

(10) Patent No.: US 6,804,316 B1
(45) Date of Patent: Oct. 12, 2004

(54) METHODS AND SYSTEM FOR PERFORMING FRAME RECOVERY IN A NETWORK

(75) Inventor: Nicholas Shectman, Somerville, MA (US)

(73) Assignees: Verizon Corporate Services Group Inc., New York, NY (US); BBNT Solutions LLC, Cambridge, MA (US); Genuity, Inc., Burlington, MA (US)

(*) Notice: Subject to any disclaimer, the term of this patent is extended or adjusted under 35 U.S.C. 154(b) by 0 days.

(21) Appl. No.: 09/448,794

(22) Filed: Nov. 24, 1999

Related U.S. Application Data

(60) Provisional application No. 60/112,729, filed on Dec. 18, 1998.

(51) Int. Cl.[7] .................................................. H03C 5/00
(52) U.S. Cl. ..................... 375/368; 375/365; 375/366; 375/377
(58) Field of Search ................................ 375/368, 365, 375/366, 377

(56) References Cited

U.S. PATENT DOCUMENTS

| | | | |
|---|---|---|---|
| 5,081,654 A | 1/1992 | Stephenson, Jr. et al. ... | 375/106 |
| 5,113,417 A | 5/1992 | McNesby .................... | 375/116 |
| 5,400,369 A * | 3/1995 | Ikemura ...................... | 375/368 |
| 5,570,370 A * | 10/1996 | Lin ............................. | 370/347 |
| 5,592,518 A * | 1/1997 | Davis et al. ................. | 375/368 |
| 6,246,736 B1 * | 6/2001 | Coady ......................... | 375/368 |
| 6,298,387 B1 * | 10/2001 | Prasad et al. ............... | 709/236 |

* cited by examiner

*Primary Examiner*—Stephen Chin
*Assistant Examiner*—Guillermo Muñoz
(74) *Attorney, Agent, or Firm*—Leonard C. Suchyta, Esq.; Joel Wall, Esq.; Finnegan Henderson et al

(57) ABSTRACT

A network device configured to detect a framing pattern includes a data scanner and a frame detector. The data scanner examines parallel bytes of data and detects portions of a framing pattern in the parallel bytes of data, identifies the phase of the framing pattern and outputs alignment information and phase information when a framing pattern has been detected. The frame detector receives the alignment information and phase information and determines whether framing patterns having the same phase relationship have been detected within a predetermined number of frames.

25 Claims, 7 Drawing Sheets

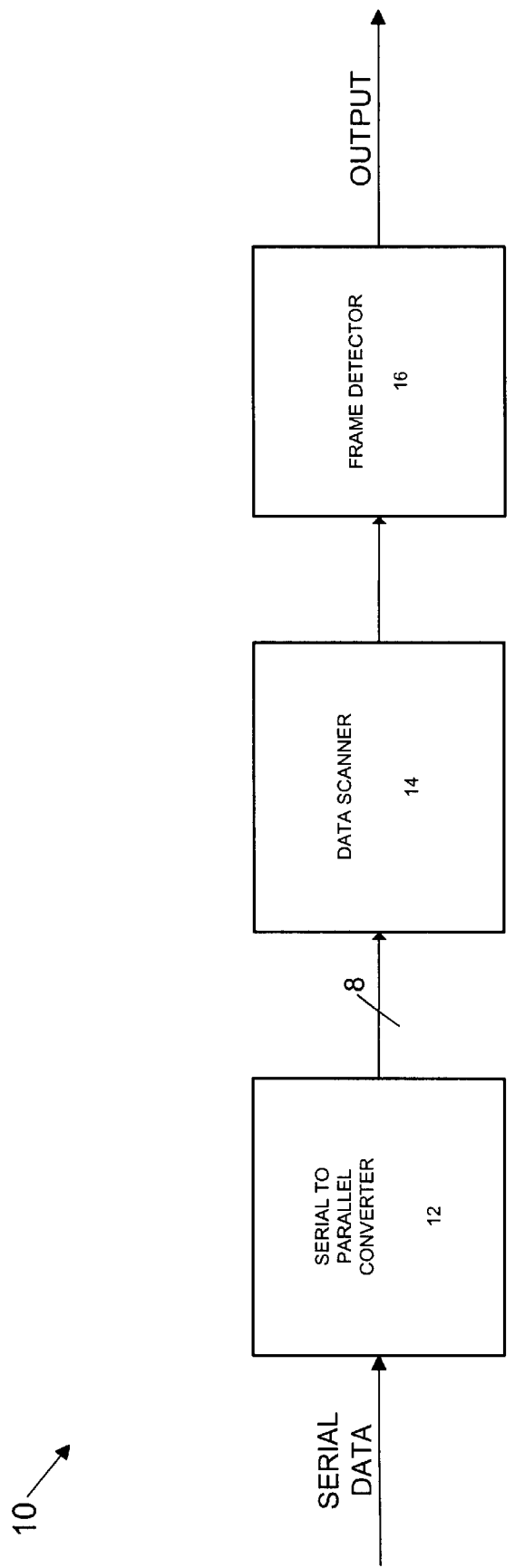

METHODS AND SYSTEM FOR PERFORMING FRAME RECOVERY IN A NETWORK

RELATED APPLICATION

This application claims priority from U.S. Provisional Patent Application Serial No. 60/112,729, filed on Dec. 18, 1998, entitled PARALLEL SONET FRAMING RECOVERY, which is incorporated herein by reference.

FIELD OF THE INVENTION

The present invention relates generally to network communications and, more particularly, to identifying a framing pattern in a stream of data.

BACKGROUND OF THE INVENTION

In data communications systems, data is typically transmitted as a series of frames. Each frame often begins with a framing pattern followed by the data information being transmitted. The receiving device detects the framing pattern to establish synchronization with the transmitting device. The receiving device is then able to process the data being transmitted.

For example, in a synchronous optical network (SONET) operating at a Synchronous Transport Signal level 1 (STS-1), each STS-1 frame consists of a serial bit stream of 810 bytes. The framing pattern for an STS-1 signal is dedicated to the first two bytes, A1 and A2, of each STS-1 frame. The pattern for bytes A1 and A2 is F628 Hex (1111011000101000) where A1 equals F6 Hex (11110110) and A2 equals 28 Hex (00101000). Higher rates (STS-N) in SONET are achieved by byte interleave multiplexing an N number of STS-1 frames. The framing pattern for an STS-3 frame in an Optical Carrier level 3 (OC-3) system is A1A1A1A2A2A2. Similarly, the framing pattern for an STS-192 frame in an OC-192 system is 192 A1 bytes followed by 192 A2 bytes.

A frame recovery circuit in the receiving apparatus searches the incoming frame for the framing pattern. After recognizing the framing pattern, the frame recovery circuit operates to provide a synchronization indication and resynchronize the receiver to the incoming data stream, in a minimum amount of time.

One drawback with conventional SONET framing recovery systems is that the frame recovery time, i.e., the time it takes the receiving device to identify the framing pattern, is too long. As network speeds achieve 10 Gb/s and higher, these high recovery times become unacceptable and result in the loss of information. Prior art systems concerned with decreasing the frame recovery time, however, often leave the system vulnerable to bit error problems or datagram attacks from a hacker, thereby causing a false synchronization indication. A bit error occurs when the frame recovery circuit misidentifies a sequence of data as equivalent to the framing pattern. A datagram attack, in contrast, is a sequence of data which, when encoded with a scrambling sequence, contains the framing pattern. In either situation, the system provides a false synchronization indication.

Another system that attempts to reduce the recovery time converts the serial bit stream into parallel units of data. However, the recovery circuit examines a 15-bit wide word to identify and determine the phase of each full eight-bit A1 and A2 pattern. For systems operating at high speeds, examining and looking for the framing pattern in this manner is too time consuming, resulting in the loss of information. Additionally, in high-speed systems, it would not be uncommon to find a random string of data equal to the framing pattern. Therefore, the prior art system is also susceptible to false synchronization indications.

Therefore, a need exists for a frame recovery system which reduces the frame recovery time and is less vulnerable to false synchronization indications.

SUMMARY OF THE INVENTION

Systems and methods consistent with the present invention address this need by performing frame pattern recognition quickly while reducing the susceptibility of the network to malicious attacks or to random sequences of bit streams.

In accordance with the purpose of the invention as embodied and broadly described herein, a system consistent with the present invention includes a data scanner and a frame detector. The data scanner examines parallel bytes of data and detects portions of a framing pattern in the parallel bytes. The data scanner also identifies the phase of the framing pattern and outputs alignment information and phase information when a framing pattern has been detected. The frame detector receives the alignment information and phase information and determines whether framing patterns having the same phase relationship have been detected within a predetermined number of frames.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 1 is a high-level block diagram of a frame recovery system in accordance with the invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention enable a data receiver to receive a stream of data from a transmitter and provide a synchronization indication when a valid framing pattern is identified. Additionally, when a valid framing pattern is not identified, the receiver is able to provide a loss of synchronization indication.

EXEMPLARY FRAME RECOVERY SYSTEM

FIG. 1 is a high-level block diagram of a frame recovery system 10 consistent with the present invention. The frame recovery system 10 includes a serial-to-parallel converter 12, a data scanner 14 and a frame detector 16.

The serial-to-parallel converter 12 receives serial data from a transmitter (not shown) and converts the serial bit stream into a parallel format. In an exemplary embodiment of the invention, the serial-to-parallel converter 12 operates to convert the serial data into eight bit words. However, in alternative configurations, the serial-to-parallel converter 12 converts the serial bit stream into parallel words of data having other sizes, based on the particular design requirements.

The serial-to-parallel converter 12 outputs the parallel data to data scanner 14. The data scanner 14 operates to identify the framing pattern, also referred to as the framing alignment pattern or synchronization pattern, as described in more detail below. In an exemplary embodiment of the invention, the data scanner 14 examines only eight bit words of information at any one time to save processing time as compared to conventional systems in which a larger word is examined for a full A1 and A2 pattern. When the data scanner 14 recognizes the framing pattern, it outputs a signal to the frame detector 16 indicating that the framing pattern has been recognized and that the pattern has a particular phase with relation to the eight bit word. The frame detector 16 then determines whether the framing pattern appears at regular intervals on frame boundaries. The frame detector 16 outputs a valid frame indication, when the valid frame pattern has been detected.

EXEMPLARY DATA SCANNER

Figure 2A:
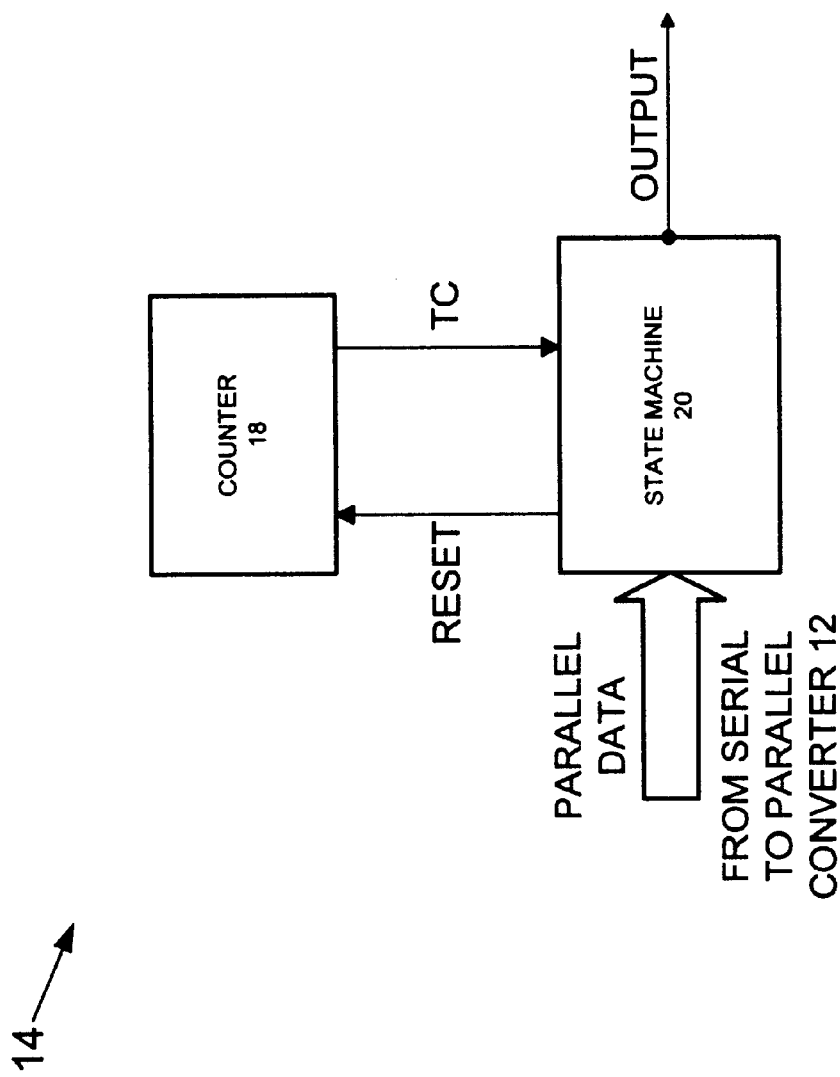
FIG. 2A is a high-level block diagram of the data scanner illustrated in FIG. 1, in accordance with the invention.

FIG. 2A is a block diagram of data scanner 14 used in accordance with an embodiment of the invention. Data scanner 14 includes a counter 18 and a state machine 20. In the exemplary embodiment of the invention, the serial-to-parallel converter 12 converts the serial bit stream into eight bit words. Therefore, state machine 20 operates on eight bit words.

The counter 18 is a conventional counting mechanism and has an input labeled Reset which is "true," i.e., equal to "1," when the state machine 20 is in certain states. The counter 18 also has an output labeled TC (terminal count) which is used by the state machine 20, as described in more detail below, to determine the number of repeated F6 or 28 sequences. "F6," i.e., bit pattern 11110110, and "28," i.e., bit pattern 00101000, represent A1 and A2, respectively, of the framing pattern.

The counter 18 is clocked once per word using the same clock (not shown) as the state machine 20. The reset input resets the counter 18 to the value "2" because the state machine 20 must detect one F6 before the counter 18 starts. The counter 18 counts to N−1, where N is the SONET order (OC-N). When the count reaches N−1, counter 18 asserts TC until it is reset. In alternate configurations where the state machine 20 operates on a wider word width, N is replaced by 8N/W, where W is the new word width. Reset and TC would then be 2 and (8N/W)−1, respectively.

Figure 2B:
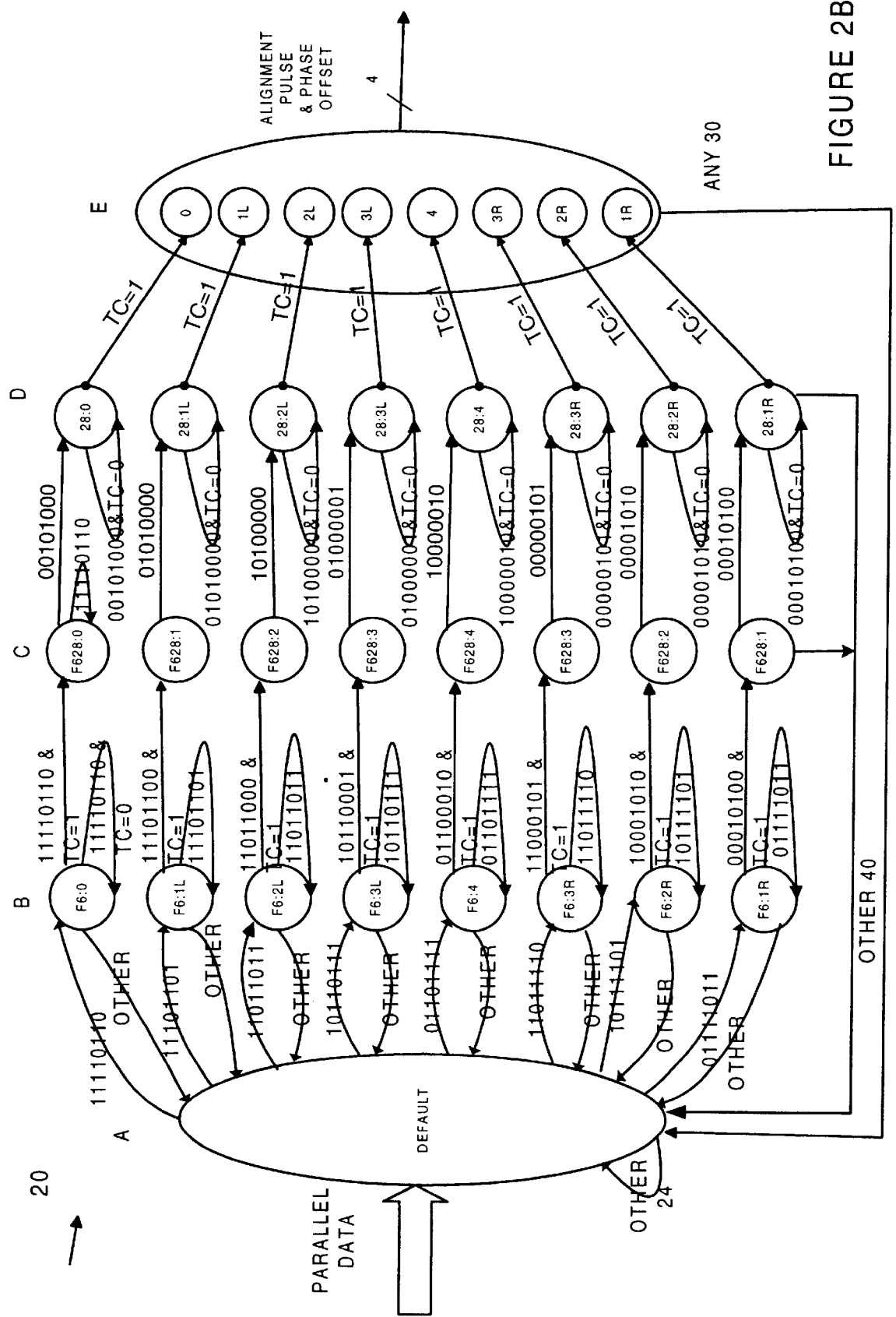
FIG. 2B is a state diagram of the state machine illustrated in FIG. 2A, in accordance with the invention.

FIG. 2B illustrates a detailed block diagram of the state machine 20 consistent with the present invention. In the exemplary embodiment illustrated in FIG. 2B, state machine 20 includes five groups of states, shown represented by columns A–E. The states represented by columns B–E each include eight substates represented by rows. The labels "y:x" in columns B–D represent the particular state, where y may be F6, F628, 28 or null, based on the particular column and "x" represents the phase information 0, 1L, 2L, etc. (i.e., the number of places the bit pattern has been shifted to the left (L) or right (R)).

The first state, Default, represented by column A, indicates that the state machine 20 is not parsing a framing pattern. The second group of states, F6:x, represented by column B, indicate that the machine is parsing the first portion of the framing pattern, consisting of repeated F6. The third group of states, F628:x, represented by column C, indicate that the machine is transitioning from parsing F6s to parsing 28s. The fourth group of states, 28:x, represented by column D, indicate that the machine is parsing 28s. The fifth group of states, x, represented by column E, indicate that the machine has successfully parsed a frame alignment pattern. While in any of the states represented by column E, the state machine 20 outputs information indicating a successful framing pattern parse. The state machine 20 asserts an alignment signal and also a signal representing the binary representation of the phase, according to which substate the machine currently operates. While in any of the states represented by columns A, C, or E, the reset signal to counter 18 is asserted.

The exemplary embodiment of the invention discussed in relation to FIG. 2B illustrates searching for the pattern "F628" as the frame alignment pattern. However, in alternative configurations, the state machine 20 identifies any particular frame alignment pattern. State machine 20 examines the contents of each eight-bit word received from the serial-to-parallel converter 12 to determine if the word represents an "F6", i.e., bit pattern 11110110 or "28", i.e., bit pattern 00101000. If state machine 20 recognizes an F6 or 28, the state machine 20 moves to the respective F6 or 28 state. The state machine 20, consistent with the present invention, can identify an F6 or 28 bit pattern that has been shifted by as many as four places to the left or right. For example, suppose the pattern 11101101 is received. The state machine logic 20 would recognize that this pattern is an F6 pattern that has been shifted in phase by one bit to the left. When the state machine 20 recognizes this shifted F6 pattern, the state machine 20 moves to the respective F6 state. In this scenario, the state machine 20 moves to the F6:1L state.

State machine 20 may be implemented as a lookup table or any other structure that facilitates pattern matching. Eight locations are reserved for all possible phase offsets for F6s, eight locations are reserved for all possible phase offsets for 28s and eight locations are reserved for all possible phase offsets for the transition word combination F6/28.

In the exemplary embodiment, state machine logic performs an 8-bit to 5-bit lookup according to the following table:

TABLE 1

| INPUT (binary) | OUTPUT (octal) |
| --- | --- |
| 11110110 | 00 |
| 11101101 | 01 |
| 11011011 | 02 |
| 10110111 | 03 |
| 01101111 | 04 |
| 11011110 | 05 |
| 10111101 | 06 |
| 01111011 | 07 |
| 11101100 | 11 |
| 11011000 | 12 |
| 10110001 | 13 |
| 01100010 | 14 |
| 11000101 | 15 |
| 10001010 | 16 |
| (unused) | 17 |
| 00101000 | 20 |

TABLE 1-continued

| INPUT (binary) | OUTPUT (octal) |
| --- | --- |
| 01010000 | 21 |
| 10100000 | 22 |
| 01000001 | 23 |
| 10000010 | 24 |
| 00000101 | 25 |
| 00001010 | 26 |
| 00010100 | 27 |
| Other | 3X (X = don't care) |

In this lookup table, the first octal digit represents the position within the sequens (0=F6, 2=28, 1=transition from F6 to 28), and the second digit represents the phase of the bits in the word being processed. If a 16-bit state machine were used, the lookup table would be an 8-bit to 6-bit lookup with two bits for position, but four bits for phase, and so on for wider state machines.

After performing the mapping according to the lookup in Table 1 above, the state machine 20 essentially performs contiguous phase block recognition. That is, the state machine 20 looks for long sequences whose second octal digit is the same. In parallel with this phase block recognition, the state machine 20 performs transition block recognition by looking for a transition byte surrounded by N−1 (or (8N/W)−1, where W is the word width) F6s before it and 28s after it.

Continuing with FIG. 2B, the state machine 20 is initialized to a default state at column A. The state machine 20 remains in the default state, as illustrated by the "other" loop 24, until an F6, or some phase offset of an F6 is received by the state machine logic. The eight F6 state locations, represented by column B, examine the received F6 pattern, or phase-shifted F6 pattern, to identify the phase offset of the F6 pattern.

The notation in the states represented in column B indicate that the state machine logic is looking for the beginning of an F6 pattern starting at the first bit of word 0 (bit 0) and counting either to the left or to the right one, two or three bits. For example, the notation F6:1L indicates that the state machine logic is looking for an F6 pattern shifted one bit to the left, which is the bit pattern 11101101. If the state machine 20 recognizes an F6 pattern that starts one bit to the left of the beginning of the eight bit word being examined, the counter 18 (FIG. 2A) starts to count the number of sequential F6s recognized at this particular phase offset. Accordingly, the state machine 20 identifies and determines the phase of A1s and A2s whose pattern boundaries do not fall on the eight bit word boundaries, as well as those that do fall on the word boundaries. As described previously, the counter 18 operates in conjunction with the state ≅chine 20 to count the number of F6s and 28s that have been recognized. The counter 18 counts until a count of N−1 is reached, where N is determined by the SONET order. For example, in an OC-192 system, N is 192 and the counter 18 counts until 191 sequential F6s have been recognized. The counter 18 in FIG. 2A is depicted separately from the state machine 20. However, in alternative embodiments, the counter 18 is included with the logic circuitry used to implement state machine 20. In FIG. 2B, the counter 18 is depicted within the state machine 20 by the loops labeled "& TC=0" and "& TC=1." The "& TC=0" loop represents that the terminal count is zero and that the counter 18 has not reached, in the example above, 191. The state machine 20 uses N−1 as the terminal count because several bits may be lost at the start of the recognition process. Advantageously, using N−1 as the terminal count eliminates potential problems associated with the lost bits. When the state changes from one of the eight state machine locations in column B to the default, the state machine 20 reexamines the data to determine if the state should change to another of the eight locations in column B.

Assuming that 191 F6s were recognized by the "F6: 1L" state, TC becomes true and the state machine 20 is ready to enter a transitional pattern state, represented by column C. The transitional pattern, as described previously, is entered into by state machine 20 in the event that the eight-bit word contains a partial F6 pattern followed by a partial 28 pattern at the same offset as the F6 patterns previously detected. Recognition of the location of this transition state and, therefore, the location of the transition word and the phase offsets of the F6 and 28 patterns within the word, enable the incoming frames of data to be properly aligned.

If the F6s are aligned to the data word, there will be no transitional pattern. However, a transitional state may still be used to match the Nth ($192^{nd}$) occurrence of F6, as no bits are lost at the beginning of the sequence. Next, when a 28 state is recognized at the correct phase offset, the counter 18 starts counting. If the counter 18 reaches 191, then TC is set to true and the state machine 20 enters the state represented at column E. At this point, the state machine has successfully identified a framing pattern. The state machine 20 then outputs an alignment pulse and phase offset. The output signal is transmitted to the frame detector 16, shown in FIG. 1.

If fewer than 191 F6s or 28s are observed, the state machine 20 returns to the default state, illustrated by any loop 30 in FIG. 2B. Additionally, for any condition other than those explicitly shown in the state diagram in FIG. 2B, the state machine returns to the Default state, as illustrated by other loop 40 from columns C and D.

Assuming that counter 18 reaches 191 at the 28 state, counter 18 asserts TC as "true" and state machine 20 outputs information indicating that a full framing pattern was recognized at a particular phase offset within an eight-bit word. The state machine 20 outputs the alignment pulse and the phase offset information to frame detector 16 (FIG. 1). The frame detector 16 then determines whether the frame alignment pattern appears regularly on frame boundaries by storing (810)(N) candidate framing alignments and "scoring" each one, as described in detail below. The frame detector 16 then determines a "winning" frame boundary, if one exists.

Exemplary Frame Detector

Figure 3:
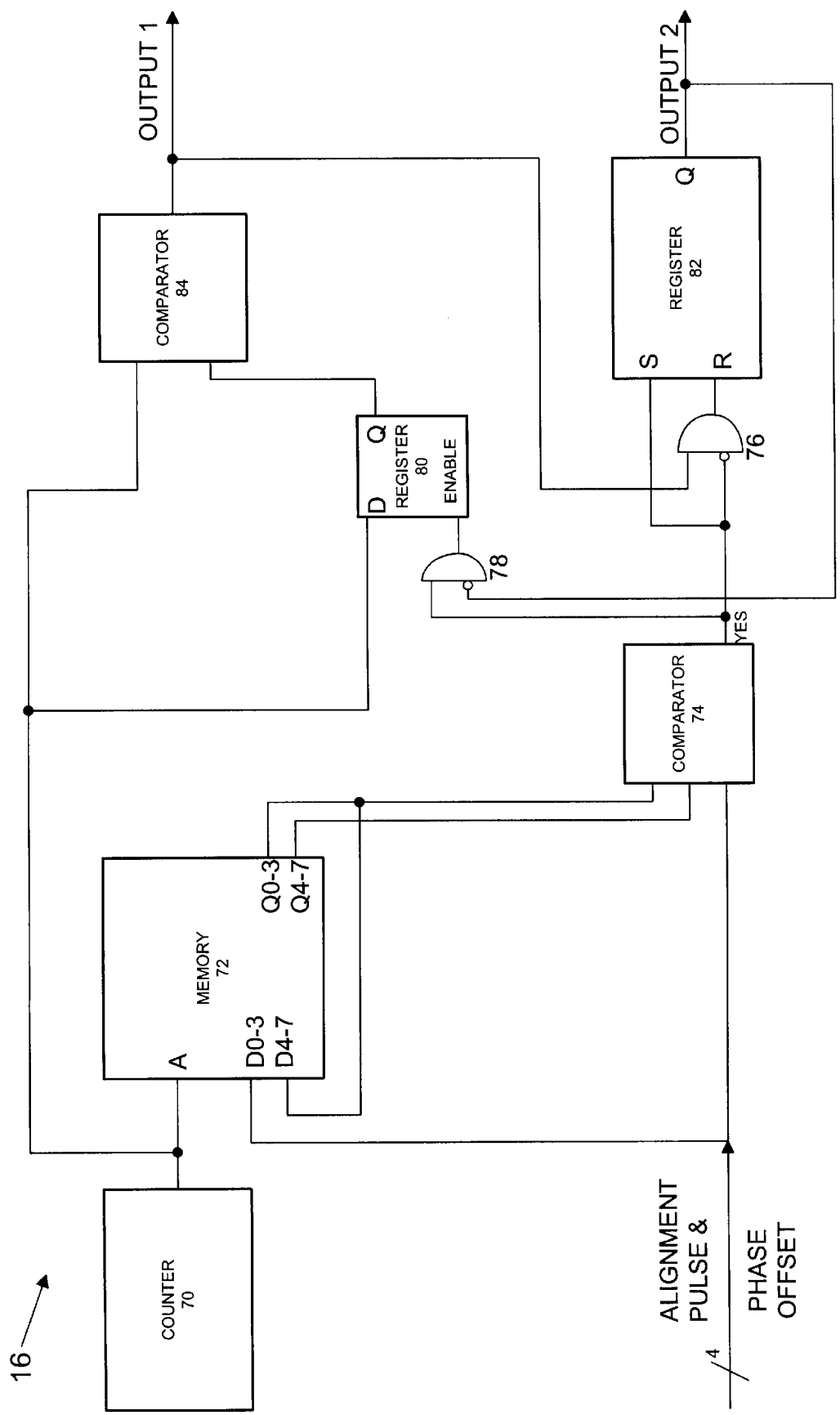
FIG. 3 is a detailed block diagram of the frame detector illustrated in FIG. 1, in accordance with the invention.

FIG. 3 is a detailed diagram of an exemplary frame detector 16, including a counter 70, memory 72, comparators 74 and 84, AND gates 76 and 78, and registers 80 and 82. The frame detector 16 receives the alignment pulse and phase offset information from data scanner 14.

The counter 70 is used to address particular memory locations in memory 72 at which the framing pattern phase information is stored. More specifically, the counter 70 counts from 1 to (810)(N) and repeats. The memory 72 may include an SRAM capable of storing at least (810)(N) words. Together, the counter 70 and memory 72 form a circular memory buffer. Data input to the buffer at cycle "x" emerges (810)(N) cycles, or 125 microseconds later (the duration of one SONET frame). If a wider word is used, N is replaced by 8N/W as discussed previously. Outputs Q0–3 connect to inputs D4–7 of memory 72 to enable the data to be delayed an additional 125 microseconds. Additional and alternative delays are also possible. The counter 70 then sends a signal to memory 72 to store the contents of the next signal generated by the data scanner 14 into a particular memory location. In this manner, the last several framing patterns of the same phase are stored in memory 72. The memory 72 always stores the output of data scanner 14 regardless of the position of counter 70. This is because the counter 70 always outputs the count to the address input A of memory 72, as opposed to merely generating an output signal when a terminal count is reached.

Comparator 74 receives the output from memory 72 and the output from data scanner 14. More specifically, in the exemplary embodiment, the comparator 74 receives the contents of the previous three outputs from the data scanner 14. Two of the three outputs are received from memory 72 and the last one from data scanner 14. In the exemplary embodiment, the comparator 74 determines whether two-out-of-three of the received signals agree. The comparator 74 generates a true output, i.e. "1," if two of the three inputs have the same value, thereby indicating that the frame alignment pattern has been recognized at the appropriate position and phase in two of the previous three frame data frames.

Using a two-out-of-three comparison logic in comparator 74 allows for the possibility of occasional transmission errors in the data frame header without losing synchronization. In alternative embodiments, the comparator 74 may be configured to compare any other number of signals and output the result, based on the particular design requirements. For example, comparator 74 may be configured to assert a "true" output when three out of four signals agree, or four out of seven, or any other desired number. In any event, when the comparator 74 determines that the results of the comparison are true, the comparator 74 outputs a signal to AND gates 76 and 78. As illustrated in FIG. 3, the output from comparator 74 is input to an inverting terminal of AND gate 76 which also receives the output from comparator 84.

Register 80 may include a D flip-flop that receives the output from counter 70 as an input and the output of AND gate 78 as an enable input. The register 80, in this manner, stores the counter value at which time synchronization was acquired. The register 80 is loaded when multiple headers are seen at the same state, but synchronization has not yet been acquired. Thus, multiple data frame headers received when the system is already synchronized do not reset the system. Comparator 84 receives the output from counter 70 and register 80 as input signals. When these input signals are equal, comparator 84 provides an output signal, OUTPUT 1, which indicates the position of the framing sequence within the data word.

The register 82 may include an S/R flip-flop that receives the output of AND gate 76 at the reset (R) input and the output of comparator 74 at the set (S) input. The register 82 provides an output signal, OUTPUT 2, which represents the acquisition state of the frame detector 16. In other words, when Q is equal to "true," the frame detector 16 has detected a valid framing pattern. This indicates that the data bits after the framing pattern represent valid data and synchronization with the transmitter has been acquired.

In the exemplary embodiment, synchronization is lost when two-out-of-three frame alignment patterns are not detected at the expected counter position (repeating every 125 microseconds, which is the duration of one SONET frame), as indicated by the logic at the R input of the register 82. In alternative embodiments, however, synchronization may be lost when any other number of frame alignment patterns received at comparator 74 are discovered to disagree, based on the particular design requirements. For example, in an alternative embodiment, synchronization could be lost when two-out-of-two frame alignment patterns received at comparator 74 do not agree. As a result, the system can easily decrease the vulnerability of the network to both bit error problems and malicious attacks, based on the particular network requirements.

In summary, the frame detector 16 generates two outputs. Output 1 indicates the position of the framing sequence and pulses every 125 microseconds. Output 2 indicates that synchronization with a transmitting device has been acquired. Output 2 may be used to signal other devices that synchronization has been acquired. Additionally, output 2 may be used as a carrier detection signal. Further, the outputs from frame detector 16, including the position of the framing sequence, enable a network receiver device to determine how data received via a network must be shifted so that the receiver device can recognize the data transmitted after the framing pattern and maintain synchronization.

Assuming that an OC-192 bit stream is converted into eight-bit words by serial to parallel converter 12, it is necessary to implement the frame detector 16 illustrated in FIG. 3 with relatively fast device technology. For example, in the exemplary embodiment, the frame detector 16 may be implemented in emitter coupled logic (ECL) device technology or in Galium Arsenide fabrication technology, thereby enabling the detector to handle the high data processing rate required. Alternatively, if the OC-192 bit stream is converted to 48, 96 or 192 bit words, the frame detector 16 could be implemented in slower device technology, such as complementary metal-oxide semiconductor (CMOS) fabrication technology. Correspondingly, it would be necessary to incorporate a logarithmically wider internal memory data bus for the circular buffer portion of the frame detector 16, in order to represent a larger number of possible phases and to incorporate a linearly smaller number of positions in the circular buffer.

Tracking multiple framing sequences in the manner described with regard to FIGS. 2 and 3 enables the present system to avoid phase ambiguity because nearly the entire sequence is matched versus a small portion in other schemes. Additionally, using the configuration illustrated in FIG. 3 to determine whether multiple data frames include the same pattern that are located at the same boundary, enables the present invention to avoid false synchronization signals.

Another advantage of storing the phase offsets of the previous several alignment patterns in memory 72 is that a receiver device in accordance with the present invention is able to quickly recover from loss of synchronization. For example, suppose the system loses synchronization due to bit errors. The frame detector 16 is able to quickly recover by examining the phase offset of the last several frame alignment patterns stored in memory 72.

Also, in other situations common in network communications, the receiver may be in alignment with a particular framing pattern and then periodically recognize a framing pattern in a different location within the frame. This different location would be stored in memory 72 at a location that is a function of the address generated by the counter 70. Now, suppose that the framing pattern to which the system had been aligned disappeared. The system would then simply examine memory 72 to see that the last couple of unexpected framing patterns were in fact valid and realign the data based on this stored information, without having to go through the entire frame recognition process. In this manner, the frame detector 16 is able to save considerable processing time associated with resynchronizing communications with a transmitter.

Exemplary System Processing

Figure 4:
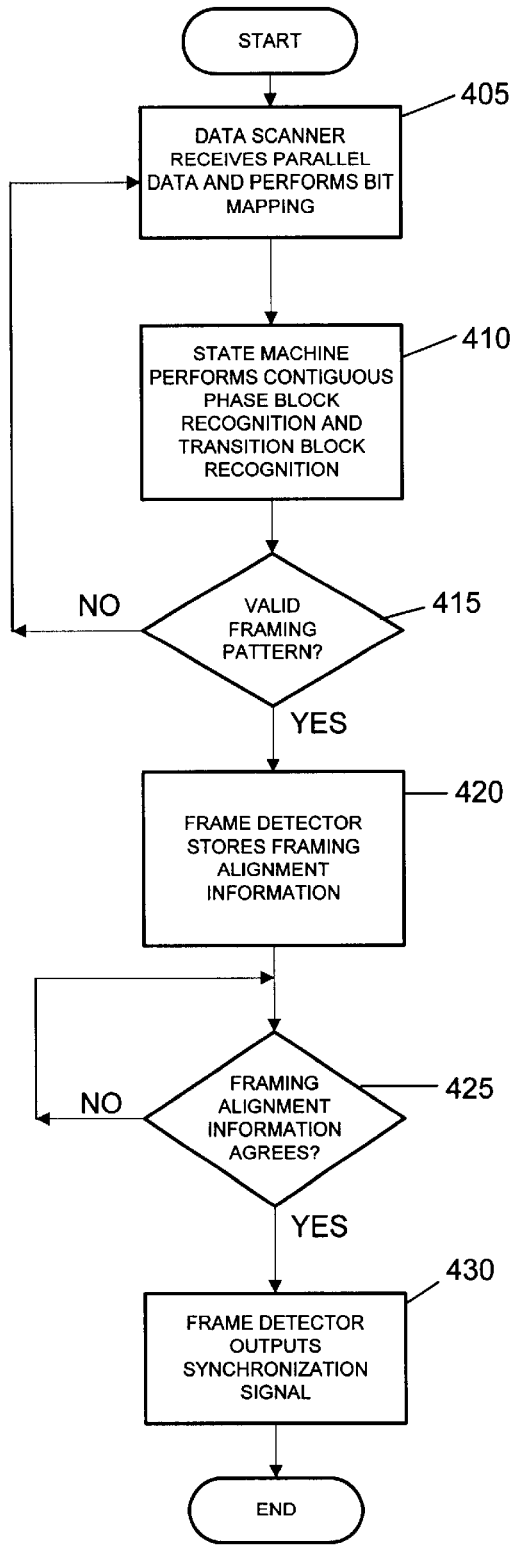
FIG. 4 is a flow diagram illustrating the operation of the data scanner and frame detector, in accordance with the invention.

FIG. 4 is an exemplary flow diagram illustrating operation of the data scanner 14 and frame detector 16 consistent with the present invention. At-step 405, the data scanner 14 receives the parallel data and maps the eight-bit data word to a five-bit value, based on look-up Table 1 described above. Next, at step 405, the state machine 20 performs the contiguous phase block recognition along with the transition block recognition. At step 415, the state machine 20 determines whether a valid framing pattern has been received. When the determination at step 415 is "no," the processing returns to step 405. When the determination at step 415 is "yes," the state machine 20 outputs the alignment pulse and phase information to the frame detector 16. The frame detector 16, at step 420 stores the framing alignment information in memory 72.

Next, at step 425, the frame detector 16 determines whether the framing alignment information, including the phase information, from a predetermined number of frames agree. When the determination at step 425 is "no", the processing repeats until the alignment information from the predetermined number of frames agree. When the determination at step 425 is "yes," the frame detector 16 outputs a frame synchronization signal at step 430. This indicates that frame synchronization has been acquired.

Exemplary Frame Recovery System in a Network Line Card

Figure 5:
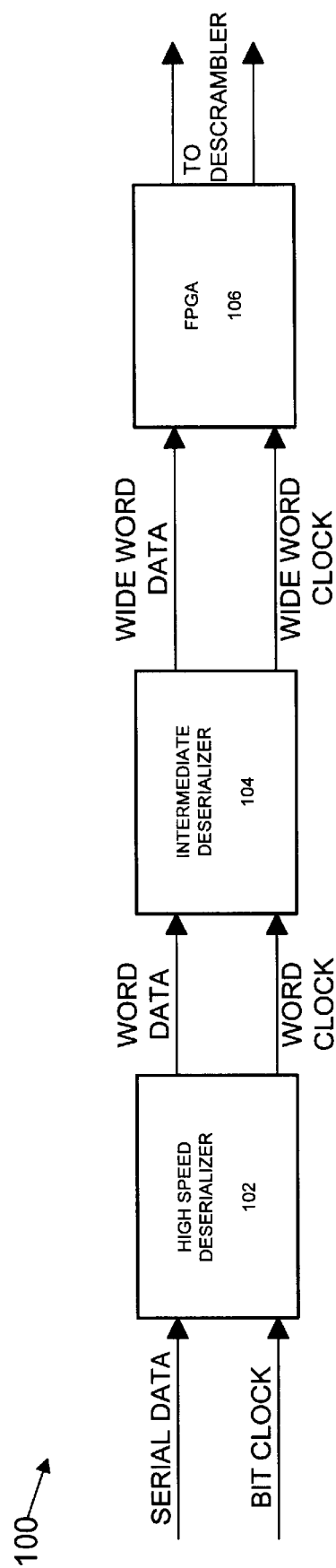
FIG. 5 is a block diagram of a data frame recovery system in a high-speed line card, in accordance with the invention.

FIG. 5 is a block diagram of a frame recovery system consistent with the present invention implemented in a line card 100 in a SONET operating at a data transmission rate of 10 GHz. The line card 100 includes a high-speed deserializer 102, an intermediate deserializer 104 and a field programmable gate array 106.

Serial data and a bit clock are transmitted to a high-speed deserializer 102. In an exemplary embodiment consistent with the invention, the high-speed deserializer 102 is a 16:1 deserializer that converts serial data and a bit clock to word data and a word clock. The deserializer 102 then outputs the deserialized word data and word clock to the intermediate deserializer 104. In the exemplary embodiment, deserializer 104 may be implemented as sixteen, 4:1 deserializers that convert the word data and clock to wide word data and clock. Intermediate deserializer 104 then transmits the wide word data and wide word clock to field programmable gate array (FPGA) 106. In alternative embodiments, the intermediate deserializer 104 may be eliminated, based on the particular design requirements.

FPGA 106 may be configured in accordance with the invention to include the data scanner 14 and frame detector 16, illustrated in FIGS. 2A–B and 3. The FPGA outputs the synchronization information to a SONET descrambler used by the network device. The FPGA 106, in the exemplary embodiment includes four FPGAs implementing 16 adjacent 3:1 deserializers each. Alternatively, the FPGA 106 may be replaced with an application specific integrated circuit (ASIC). If an ASIC were used, the deserialization performed by deserializers 102 and 104 could be at least partly included as a function on the ASIC.

Assuming that the configuration in FIG. 5 is used in an OC-192 system and includes one 16:1 deserializer 102, sixteen 4:1 deserializers 104 and four FPGAs, the 192-bit wide data is split into four 48-bit slices. Framing byte detection and phase reporting are accomplished using lookup tables implemented in the FPGAs. The byte phase is then assembled in two steps due to the large word width. Sequences of up to six bytes are assembled in the FPGAs. The sequence presence, size and phase are reported to one of the FPGAs, where sequences of up to 24 bytes (192 bits) are assembled and reported to a state machine. Framing sequence alignment within the byte stream is recovered by recognizing the transition from the A1 byte to the A2 byte, at the first byte phase detection stage. Byte phase assembly, including the transition byte, propagates the position of the transition byte at all stages. Subsequent SONET level processing also occurs within these FPGAs. In the embodiment illustrated in FIG. 5, off-the-shelf FPGAs may be used to meet the timing requirements for the system.

Exemplary Frame Recovery System in a Network Switch

Figure 6:
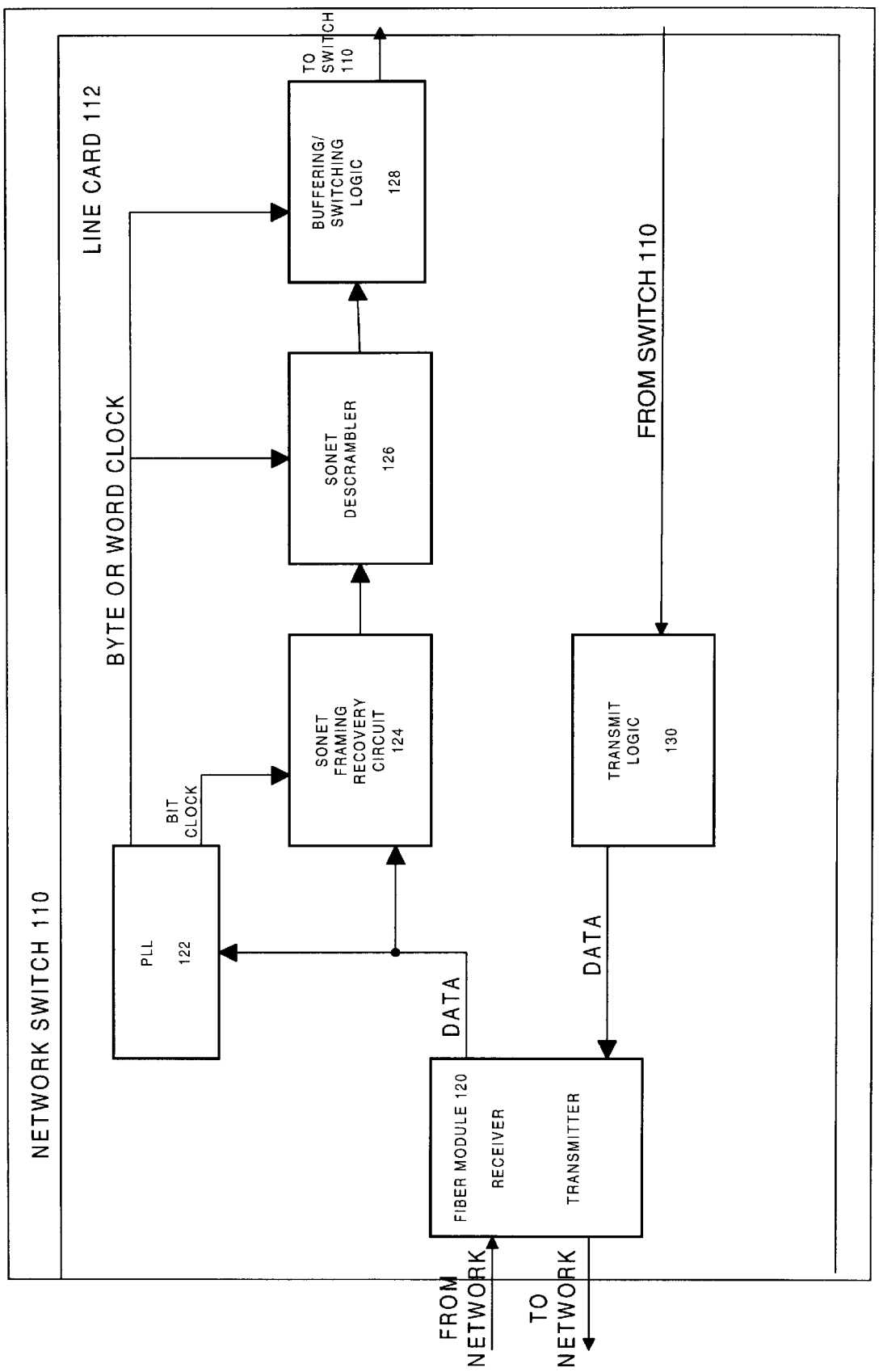
FIG. 6 is a block diagram of a data frame recovery system in a network device, in accordance with the invention.

FIG. 6 illustrates a frame recovery system in an embodiment consistent with the present invention implemented in a network switch 110. Network switch 110 includes line card 112. The line card 112 includes a fiber module 120, phase-locked loop (PLL) 122, SONET framing recovery circuit 124, SONET descrambler 126, buffering/switching logic 128 and transmit logic 130.

The fiber module 120 may include a photodiode receiver to receive data from an OC-N network and a laser transmitter for transmitting data onto the network. The fiber module 120 transmits data to a phase locked loop (PLL) 122 and SONET framing recovery circuit 124. The PLL 122 provides a bit clock output to the SONET framing recovery circuit 124. The SONET framing recovery circuit 124 performs the frame synchronization functions illustrated in FIGS. 2A–B and 3. More specifically, the SONET framing recovery circuit 124 performs byte alignment and provides frame demarcation and demultiplexing. The SONET framing recovery circuit 124 transmits the data to a SONET descrambler 126 which descrambles the data stream and framing information. The descrambler 126 then outputs the data to a buffering/switching logic 128 for transmission to other network switch 110 logic, based on the byte alignment data and the framing information. In this manner, the network switch 110 is able to make data transmission decisions. The transmit logic 130 receives data from the network switch 110 fabric and performs its transmission functions outside of the framing recovery circuit 124. In alternative embodiments, the network switch 110 may be a router, multiplexer or another network device.

Systems and methods consistent with the present invention detect a framing pattern transmitted in a serial stream of data. In alternative configurations consistent with the present invention, the state machine 20 accepts words wider than eight bits. For example, words 16 bits and wider could be examined by the state machine 20. In this event, the state machine 20 would be modified to include additional states. Additionally, if the data width supported by the state machine 20 is expanded to correspond to the data rate, the need for a counter 18 operating with the state machine 20 is eliminated, thereby simplifying the state machine design.

Using a wide data path, however, does not necessarily require increasing the number of states of the state machine 20. For example, if the data path from serial-to-parallel converter 12 (FIG. 1) is 192 bits wide, 24 scanners arranged as four groups having six scanners each may be used. In this scenario, each scanner would still only examine eight bits at a time.

Systems and methods consistent with the present invention can be used with any network transmitting framing pattern information to establish synchronization. In particular, a system consistent with the present invention is particularly useful in a SONET. Such systems and methods are also usable with any SONET order network and at any logic speed by simply changing the state machine word width. Additionally, identifying the entire framing sequence and tracking multiple candidate framing sequences enables the present systems and methods avoid phase ambiguity and to avoid false synchronization indications associated with bit error problems and malicious attacks from hackers. A further advantage of the systems and methods consistent with the present invention is that they enable a network device to recover quickly from framing alignment changes due to optical path reconfigurations.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the following claims and their equivalents.

What is claimed is:

1. A system for detecting a framing pattern transmitted with a serial stream of data, comprising:
   a data scanner configured to:
      examine parallel bytes of data,
      detect portions of a framing pattern in the parallel bytes of data,
      identify the phase of the framing pattern, and
      output alignment information and phase information when a framing pattern has been detected; and
   a frame detector configured to:
      receive the alignment information and phase information, and
      determine whether N framing patterns having the same phase relationship have been detected within M frames, where N and M are integers greater than one and M is greater than N.

2. The system of claim 1, wherein the frame detector includes a comparator to compare the alignment information and phase information from the M frames and to determine whether a valid framing pattern has been received, based on a result of the comparison.

3. The system of claim 2, wherein the frame detector outputs a frame synchronization signal when the valid framing pattern has been received.

4. The system of claim 2, wherein the frame detector includes:
   a memory to store the output from the data scanner, and
   wherein the comparator compares the alignment information and phase information from at least two frames to determine whether a valid framing pattern has been received.

5. The system of claim 2, wherein the comparator outputs a synchronization signal when the alignment information and phase information from at least two of three consecutive frames are the same.

6. The system of claim 2, wherein the frame detector outputs a signal indicating loss of synchronization when a valid framing pattern has not been received.

7. A system for detecting a framing pattern transmitted with a serial stream of data, comprising:
   a data scanner configured to:
      examine parallel bytes of data,
      detect portions of a framing pattern in the parallel bytes of data,
      identify the phase of the framing pattern, and
      output alignment information and phase information when a framing pattern has been detected;
      wherein the data scanner is implemented as a state machine including:
         a first plurality of states corresponding to a first portion of the framing pattern;
         a second plurality of states corresponding to a second portion of the framing pattern; and
         a third plurality of states corresponding to a transition between the first and second portions of the framing pattern; and
   a frame detector configured to:
      receive the alignment information and phase information, and
      determine whether N framing patterns having the same phase relationship have been detected within M frames, where N and M are integers and M is greater than N.

8. The system of claim 7, wherein the data scanner includes a counter configured to count to a predetermined number representing a number of consecutive portions of the framing pattern detected, and
   wherein the state machine is configured to output the alignment information and phase information when the counter reaches the predetermined number and the state machine is in one of the second plurality of states.

9. The system of claim 1, wherein the data scanner is configured to examine eight bit data words.

10. In a network device configured to receive serial data, a method of detecting a framing pattern transmitted with a serial stream of data, comprising:
   converting the serial stream of data into parallel bytes of data;
   examining the parallel bytes of data;
   determining whether the parallel bytes of data include a portion of the framing pattern;
   identifying the phase of the framing pattern, when the detecting step detects a portion of the framing pattern;
   determining whether a predetermined number of portions of the framing pattern have been detected;
   outputting alignment information and phase information associated with the framing pattern, when the predetermined number of portions of the framing pattern have been detected; and
   detecting whether N framing patterns having the same phase relationship have been detected within M frames, wherein N and M are integers greater than one and M is greater than N.

11. The method of claim 10, wherein the detecting step includes:
   storing alignment information and phase information associated with a plurality of frames;
   comparing the alignment information and phase information corresponding to consecutive data frames; and
   determining whether the framing pattern is valid based on an output of the comparison.

12. The method of claim 10, further comprising:
   outputting a synchronization signal indicating that the framing pattern is valid, when the detecting step indicates that the alignment information and phase information from at least two of three consecutive frames are the same.

13. The method of claim 10, further comprising:
outputting information indicating loss of synchronization when the detecting step indicates that N framing patterns having the same phase relationship have not been detected within M frames.

14. The method of claim 10, wherein the examining step comprises:
analyzing eight bit data words.

15. A network device configured to receive data from a synchronous network, comprising:
a first deserializer configured to receive serial data and to convert the data into parallel bytes of data;
a logic circuit configured to:
examine the parallel bytes of data,
detect portions of a framing pattern in the parallel bytes of data,
identify the phase of the framing pattern, and
output alignment information and phase information when a framing pattern has been detected; and
a frame detector configured to:
receive the alignment information and phase information, and
determine whether N framing patterns having the same phase relationship have been detected within M frames, wherein N and M are integers greater than one and M is greater than N.

16. The network device of claim 15, further comprising:
a second deserializer coupled to the first deserializer, wherein the second deserializer is configured to:
receive the parallel bytes of data,
convert the parallel bytes of data into a second set of parallel data bytes, and
transmit the second set of parallel data bytes to the logic circuit.

17. The network device of claim 16, wherein the second deserializer comprises sixteen 4:1 deserializers.

18. The network device of claim 16, further comprising:
a third deserializer coupled to the second deserializer, wherein the third deserializer comprises sixty-four 3:1 deserializers.

19. The network device of claim 15, wherein the first deserializer comprises a 16:1 deserializer.

20. The network device of claim 15, wherein the logic circuit is implemented on a field programmable gate array or on an application specific integrated circuit contained in a network switch or network router.

21. An apparatus for detecting a framing pattern transmitted with a serial stream of data, comprising:
means for examining parallel bytes of data and detecting a framing pattern in the parallel bytes of data;
means for identifying the phase of the framing pattern and outputting alignment information and phase information when a framing pattern has been detected; and
means for determining whether N framing patterns having the same phase relationship have been detected within M frames, wherein N and M are integers greater than one and M is greater than N.

22. The apparatus of claim 21, further comprising:
means for outputting a synchronization signal when the means for determining determines that a valid framing pattern has been detected.

23. A data scanner for detecting a framing pattern, comprising:
a state logic circuit configured to:
analyze parallel bytes of data,
detect portions of a framing pattern in the parallel bytes of data,
identify the phase of the framing pattern, and
output alignment information and phase information when a framing pattern has been detected; and
a counter coupled to the state logic circuit, the counter configured to:
signal the state logic circuit when a predetermined number is reached, the predetermined number representing a number of portions of the framing pattern.

24. A frame detector for receiving framing alignment information including phase information related to the framing alignment information, comprising:
a memory configured to store the framing alignment information; and
a comparator configured to compare the framing alignment information associated with a plurality of different data frames to determine whether N framing patterns having the same phase relationship have been detected within M frames, wherein N and M are integers greater than one and M is greater than N.

25. The frame door of claim 24, wherein the frame detector is configured to output a frame synchronization signal based on the result of the comparison.

* * * * *